United States Patent Office 2,742,736
Patented Apr. 24, 1956

2,742,736

TREATMENT OF CITRUS TREES INFESTED WITH NEMATODES

Grace A. MacKay, Upland, Calif.

No Drawing. Application July 6, 1954,
Serial No. 441,660

13 Claims. (Cl. 47—58)

This invention relates to treatment of citrus trees infested with nematodes; and it comprises a method of treating citrus trees infested with nematodes and having such symptoms as shriveling and loss in yield of fruit, defoliation, lack of new growth, drying and dying of branches followed by eventual death, usually without any other apparent manifestation of disease symptoms above the ground. My treatment consists in treating the ground around and the root system of a tree infested with nematodes with a dilute aqueous solution of iodine, for example by constructing a wall around the tree to form a basin or well capable of holding at least from about 5 to 20 gallons of water, then adding a dilute aqueous solution of iodine to the basin in amount sufficient thoroughly to wet the root system of the tree and the ground around it at least out to the drip of the tree and preferably to a distance of about 2 feet or more beyond the drip of the tree, this iodine treatment being advantageously followed and/or preceded by thoroughly soaking the ground around the tree with water; all as more fully hereinafter set forth and as claimed.

This application is a continuation-in-part of my copending prior applications, Serial No. 325,452, filed December 11, 1952, now Patent No. 2,734,314, and Serial No. 346,805, filed April 3, 1953 and now abandoned. In the earlier of these two prior applications I described a treatment for "scaly bark," more correctly "psorosis," in which a dilute aqueous iodine solution is applied directly to the affected parts of the tree, such as the trunk and branches. A treatment for brown rot gummosis and mal di gomma is also described. In the latter treatment a relatively more dilute iodine solution is applied to the ground around the afflicted tree and also, of course, inherently to the root system of the tree, by saturating the ground with the dilute iodine solution. These two treatments are, of course, applied quite differently.

In Serial No. 346,805 I originally and erroneously reported that the treatment for brown rot gummosis and mal di gomma described in the first application is also effective in curing or at least remitting the symptoms of "quick decline." The present application is filed principally to report my discovery that the trees to which I had successfully applied my iodine treatment, as disclosed in Serial No. 346,805, and which I thought were afflicted with "quick decline," because of a faulty diagnosis by an expert, were actually afflicted by an infestation of citrus nematodes rather than "quick decline" and that surprisingly my treatment is effective in controlling and/or eradicating this pest. The name "slow decline" has been frequently used to designate an ailment which has later been established as being due to the depredations of nematodes.

As reported in my copending application, Serial No. 346,805, my first experience with what an expert diagnosed as "quick decline" came when I noticed late one January that one tree in the most southern row of my grove appeared to be dead while 8 others were badly affected, the leaves being wilted and turning brown while the fruit had failed to size and had wrinkled. I called in an expert and his report read, "Quick decline. Nothing whatever can be done about it. It can't be cured." He recommended prompt removal of all 9 trees and replacement with stock alleged to be resistant to this disease. Instead I started digging around the dead tree to determine if possible just what had killed it. I removed the soil to a depth of about 40 inches and exposed the tap root. Each inch on the way down revealed a dryer and dryer condition. The soil around the tap root was bone dry. It was evident that the tree had died basically from lack of moisture and food.

Instead of removing the other affected trees as recommended I first attempted to revive them by water alone, feeding their roots with water passed through auger holes and soaking the ground around them by making basins or wells about the trees and filling with water. After an interval of about a week the trees showed some improvement but three weeks later they were again on the sick list. I then decided to try my remedy already found successful for treating brown rot gummosis.

In this treatment I employed 7% tincture of iodine solution diluted 1 to 16. In treating each of the 8 trees I first made up a dilute batch of iodine solution by adding the diluted iodine preparation to 5 gallons of water. The amounts added to the 5 gallon batches were varied to produce iodine concentrations varying from batch to batch from 0.01 to 0.1% by weight. Each tree was treated with one of these batches by pouring one half, i. e. 2½ gallons into a 6 foot diameter well about the tree, while the remaining 2½ gallons, after dilution with water 1 to 1, was sprayed on the surrounding ground out to the drip of the tree. No other treatment was used except that after an interval of 6 hours the soil was sprayed with water for one hour. Every one of the 8 trees thus treated has since recuperated fully and is now bearing normally, the rehabilitation being so swift that it seemed like a miracle.

The most dilute iodine solution introduced into the well in one of these tests had an iodine concentration of about 0.01% while that sprayed on the ground was half of this. The most concentrated solution contained about 0.1% iodine by weight.

During my experiments with the described root system iodine treatment I became suspicious that what I was treating was not a disease, strictly speaking, but rather an infestation of citrus nematodes. The various publications which I read on this subject described symptoms, namely loss in yield, yellowing and falling of foliage, lack of new growth, drying out and dying of branches and eventual death of the trees, which were identical to those encountered in my grove and which had been diagnosed by experts as being due to "quick decline." I learned that nematodes propagate very rapidly and soon after birth bury their heads in the fine feeder roots of a citrus tree and thereafter suck from the roots the life sustaining sap. This would account for the dehydration and starvation of the trees which I had treated.

I could find no satisfactory way of testing for the presence of nematodes myself; the services of an expert in this field were obviously required. So I sent to such an expert one sample of soil and feeder roots taken from a tree which was badly afflicted but which I had not yet had the opportunity to treat with iodine and a second similar sample taken in the same way from an afflicted tree which I had treated as described below with iodine about a month previously. This expert reported, as I had suspected, that the first sample contained large numbers of live nematodes, while the second sample also contained nematodes, but that these nematodes were dead.

These tests proved to me that I had been successfully combatting with my iodine treatment an infestation of citrus nematodes. Apparently nematodes are killed by free iodine, possibly due to the fumigating action of the latter. Iodine vapors are heavy and after my treatment penetrate the soil for a substantial depth. To my knowledge this is the first successful treatment for nematodes which can be applied to the soil and the root system of a citrus tree without killing or injuring the tree. Other treatment for killing nematodes in the soil, which have been used commercially, are known to kill or injure plant life. However it has been reported in the literature that, when certain seeds and bulbs and the roots of strawberry plants, infested with nematodes, have been dipped in solutions of iodine, the nematodes have been killed.

In the particular treatment used on the citrus tree, the root sample of which was reported as containing dead nematodes, I had built a basin around a large tree, having a diameter of about 21 feet and extending out to about 2 feet beyond the branches, i. e. beyond the drip of the tree. The basin was constructed by piling up a ring of dirt around the tree to a height of about 6 to 8 inches. This basin was first filled with water which was allowed to soak in. The basin was then again filled with water. To this was added about 5 gallons of water with which a cup full (about 8 ounces) of 7% tincture of iodine had been mixed. This dilute iodine solution was made up in a 5 gallon pressure sprayer and was sprayed uniformly over the surface of the water in the basin. After the resulting dilute solution of iodine in the basin had soaked in the basin was again filled with water. That completed the treatment. Within about 10 to 20 days after this treatment a few new leaves appeared along the formerly bare branches and within a few weeks new leaves appeared on the whole tree. No further symptoms of dehydration or starvation have subsequently appeared.

A more general description of my method of treating a citrus tree infested with nematodes can be outlined as follows:

1. If the tree has any dead limbs or branches, remove them and seal all wounds. Then clean out beneath the tree and level soil by raking.

2. Test for plow sole to see if water can penetrate the soil. If a garden fork cannot penetrate a lower layer, use a soil auger, to make at least 4 holes per tree at least 2 feet deep. These should be spaced at equal distances about the tree and several feet from the trunk.

3. Form a basin by throwing up a soil retainer made not by ditching but by adding enough soil to form a raised dirt wall around the tree 8 inches high at the drip of the tree or 2 feet outside the drip of trees that are widely spaced. If the acreage being treated has a slope of more than 10 inches from the tree drip at the top of the basin to the tree drip at the lower side then better results are obtained using two half circles, one half being higher than the other, as this will more evenly distribute the iodine solution around the tree.

4. Fill the basin slowly with water and let it sink in while preparing another tree.

5. Refill basin with water then mix in uniformly from about ½ to 2 cups of 7% tincture of iodine in alcohol. The tincture of iodine should preferably be first mixed with about 5 gallons of water and this mixture distributed and mixed uniformly with the water in the basin. It can be sprayed uniformly on the surface of the water or distributed by pouring small portions about every three feet around the basin and stirring with a rake, for example. If a 5 gallon pressure sprayer is available this can be filled with water, the tincture of iodine added and mixed in, followed by spraying of the dilute iodine over the surface of the water in the basin.

6. After the iodine solution has soaked in fill the basin to capacity and let stand. No further treatment should be required for 9 months or a year. No harm will be done if an excess of iodine is used. It makes everything to which it is applied grow vigorously.

7. An easier but somewhat less satisfactory method of applying the iodine to citrus trees can be used by those who do not have water pressure available. This makes use of a water tank like that used by all pest control companies. The tank is filled with dilute iodine solution made by mixing 8 ounces of 7% tincture of iodine per 5 gallons of water. The ground around the trees is then sprayed with this dilute iodine solution immediately after the trees are irrigated. For each 5 gallons of the dilute iodine solution in the tank from about ½ to 4 trees can be treated.

8. It is important that treated trees, especially if cut back and always in the heat of summer, be irrigated twice a month. Young and small trees should receive amounts of solution in proportion to their size.

9. The iodine solution should not be applied to dry soil and be left to dry since the iodine would soon sublime and be lost. But if carried into the soil with water it will last a long time. In one case the roots and soil about a tree were examined six weeks after an iodine treatment, during which period 6 inches of rain had fallen. But iodine was still present in the soil.

The basic feature of my method is to apply iodine to the soil about a citrus tree out at least to the drip of the tree at the rate of from about 1.5 to 15 grams per tree or from 0.05 to 0.5 gram per square foot of soil treated about the tree for basins ranging in size from about 20 to 6 feet in diameter, and to wash this iodine into the soil with water. The manner in which the iodine is applied to the soil and the manner in which it is washed in are of secondary importance so long as the iodine is not wasted by sublimation. Of course the water present in the dilute iodine solution employed in my process tends to wash the iodine into the soil and when highly dilute iodine solutions are used this water may be sufficient alone without the subsequent application of water. This is true particularly when the soil is wet, as by irrigation, before the iodine is applied. The chemicals which are present in the iodine solution aside from the iodine are also largely of secondary importance provided that they are non-toxic and non-reactive with the iodine. Thus, since iodine is soluble in water to the extent of about 0.04% it is possible to employ a saturated solution of pure iodine in the treatment. However it is much more convenient to prepare the dilute iodine solution used in the treatment by suitably diluting the ordinary tincture of iodine.

Tincture of iodine is sold in a "mild" preparation containing per 100 ml. from about 1.8 to 2.2 g. iodine and from about 2.1 to 2.6 g. NaI dissolved in alcohol of from about 43 to 50% by volume. "Strong" tincture of iodine contains from 16 to 17 g. iodine and 2 to 4 g. KI dissolved in 100 ml. alcohol of from about 60 to 65% by volume. These preparations can be used in my process if diluted to the proper degree. It is also possible, of course, to supply to the trade highly concentrated solutions of iodine in various iodine solvents containing dissolving agents, such as aqueous alkali metal iodide solutions or water-miscible organic solvents, such as low molecular alcohols, acetone, ethylene glycol, glycerine etc. with instructions that the preparations be diluted to the proper degree.

It is also possible to supply the iodine in the form of capsules or tablets to be dissolved in a given quantity of water. A tablet containing about 1.5 to 15 g. iodine can be used for treating one tree, for example, after being dissolved in 5 to 10 gallons of water. An alkali metal iodide should be included in these tablets since this speeds the dissolution of the iodine and also helps to prevent the iodine from subliming. The amount used per tablet can vary widely, but approximately as much iodide should be included as iodine. An additional amount up to about 5 g. per tablet is advantageous. If desired other compatible agents capable of retarding sublimation of the iodine can be added to the tablets. It is also possible to add solid compatible surface active agents to assist penetration of the iodine into the soil.

The case history of orange tree #14 can be cited as one in which the affliction was originally diagnosed as quick decline. This tree is just north of my home and positioned between two flower gardens. One day I noticed that this tree had shed its bloom early before fruit had formed satisfactorily. Soon after its leaves started turning yellow, some limbs soon appeared nearly bare of leaves. Then one morning I found one limb dead and another with many dead fruit wood branches and few oranges left on the tree had turned a sickly yellow green. The diagnosis of an expert was—"quick decline." My first conclusion was—too much water. This was a natural conclusion since the gardens on either side had received ample water. But I tested for moisture and was surprised to find that the soil about the trunk was so devoid of moisture and so compact that penetration was most difficult. The two denuded branches died and were removed. I then decided to apply my iodine treatment. This was accomplished by forming a 6 foot diameter well about the tree. In making up the iodine treating solution I first diluted tincture of iodine (7%) with water 1 to 16, then added a pint of this to 5 gallons of water. One half of this batch was poured into the well while the remainder was diluted 1 to 1 with water and sprayed on the surrounding ground out as far as the branches extended. After a delay of 6 hours the ground was thoroughly watered. The tree responded so wonderfully to this treatment that it now has two new branches to replace the lost ones and an abundant covering of leaves. It is now again a healthy tree.

In one of my treatments I have started with removing all leaves and other debris from a circular area around the tree trunk then forming a well capable of holding about 20 gallons of water. The soil is thoroughly cultivated. About 10 gallons of water are then poured into the well. Then when the soil has absorbed the water the well is flooded with about 20 gallons of dilute iodine solution, this being formed by adding about one gill of tincture of iodine to about 20 gallons of water, resulting in an iodine concentration of about 0.01% by weight. The iodine solution is poured slowly around and also on the tree trunk taking care that it directly reaches all affected areas of trunk and roots. This treatment may be repeated in about 15 days but one application is usually adequate. As yet I have found no afflicted tree requiring a third application of iodine. The trees so treated have been completely rejuvenated.

In still another treatment which I have used successfully a dilute iodine solution is prepared by adding a gill of tincture of iodine to 12 quarts of water. The soil about the tree is first saturated with about 10 gallons of water, the dilute iodine solution is then applied and allowed to soak in and finally the iodine is washed in by an additional 10 quarts of water to carry it down to the bottom of the infected root area.

While I have described what I consider to be the most advantageous embodiments of my process it is obvious, of course, that various modifications can be made without departing from the purview of this invention. Thus it is possible to include in my iodine preparations wetting agents, such as cationic soaps, non-ionic or anionic surface-active agents, such as sodium naphthenic sulfonate and cetyl pyridinium iodide, which are non-toxic and non-reactive with iodine. A large number of suitable wetting agents are now commercially available, being sold as synthetic detergents. Any of these can be used which are compatible (non-reactive) with iodine and non-toxic. These can be added in concentrations ranging from about 0.005 to 0.1% and assist in making the iodine solution penetrate the soil. The iodine in my preparations can be either in dissolved or emulsified form. In making the concentrated preparations which are distributed to the trade it is important to employ materials which are non-toxic. A simple toxicity test is to apply the materials to grass in concentrated form. If the grass is killed the material is likely to be toxic to citrus trees. It is possible, of course, to employ several iodine treatments. When the more dilute iodine solutions are used and in the case of badly afflicted trees, two treatments can be administered six months apart at the time of growing periods which are spring and fall. If several treatments are used, these should be spaced apart at least from about 2 to 4 weeks. But, as stated previously, one treatment is usually adequate. The actual method of applying my dilute iodine solutions to the soil is not important. Thus soil augers can be employed to drill a series of holes about the afflicted tree and these holes flooded with the iodine solution. It is also possible to employ a hose equipped with a metal pipe which can be inserted into the soil to a depth of a foot or more and making use of an iodine-containing capsule in a by-pass chamber in the nozzle, so that the iodine gradually dissolves in the water passing through the by-pass to make the required dilute solution of iodine. Or a trench can be formed around the tree and filled with the iodine solution. The important factor is to thoroughly impregnate or saturate the soil about the tree and about its roots to a depth of at least from about 6 inches to 3 or more feet with a dilute iodine solution which has a concentration ranging from about 0.005% up to concentrations tending to damage the tree. I have not accurately determined this upper toxic limit but believe it is between about 0.5 and 1% by weight. I have used concentrations up to about 0.2% iodine. There is no point in using such high concentrations, however, since much more dilute solutions will accomplish satisfactory results. Further modifications of my process which fall within the scope of the following claims will be immediately evident to those skilled in this art.

What I claim is:

1. In the treatment of citrus trees infested with nematodes and accompanied by such symptoms as shriveling and loss in yield of fruit, defoliation, lack of new growth, drying and dying of branches followed by eventual death, the process which comprises thoroughly saturating the soil around such an afflicted tree with a highly dilute aqueous solution of iodine having a concentration ranging from about 0.005% up to but below concentrations tending to damage the tree and washing the iodine into the soil with water.

2. The process of claim 1 wherein the iodine solution has a concentration ranging from about 0.005 to 0.5% by weight.

3. The process of claim 1 wherein the iodine is applied to the soil about the tree out at least to the drip of the tree at the rate of from about 1.5 to 15 grams iodine per tree.

4. The process of claim 1 wherein the iodine solution is added to a basin surrounding the tree at the rate of from about 0.05 to 0.5 gram of iodine per square foot of soil in the basin.

5. The process of claim 1 wherein the dilute iodine solution is made by adding tincture of iodine to the required amount of water.

6. The process of claim 1 wherein the soil is saturated by forming a basin around the tree having a diameter of at least about 6 feet and adding from about 2½ to 20 gallons of the iodine solution to the basin.

7. The process of claim 6 wherein the soil outside the basin and out to the drip of the tree is also saturated with the iodine solution.

8. The process of claim 1 wherein the dilute iodine solution is added to a basin built around the tree and extending outwards to a distance of about 2 feet beyond the drip of the tree.

9. The process of claim 1 wherein the iodine solution contains a non-toxic compatible wetting agent to assist penetration of the soil with the iodine solution in concentrations ranging from about 0.005 to 0.1% by weight.

10. The process of claim 1 wherein the iodine solution is sprayed on the ground surrounding such a tree just after irrigation of the tree.

11. In the treatment of citrus trees infested with nematodes and accompanied by such symptoms as shriveling and loss in yield of fruit, defoliation, lack of new growth, drying and dying of branches followed by eventual death, the process which comprises forming a basin about such an afflicted tree having a diameter ranging from about 6 to 20 feet, distributing uniformly in said basin a highly dilute solution of iodine having a concentration ranging from about 0.005 to 0.5% by weight, letting the iodine solution soak into the ground and then washing the iodine into the soil by filling the basin with water and letting it soak in.

12. The process of claim 11 wherein the iodine solution contains from about 1.5 to 15 grams of iodine.

13. The process of claim 11 wherein the iodine solution contains from about 0.05 to 0.5 gram of iodine per square foot of soil in the basin.

References Cited in the file of this patent

UNITED STATES PATENTS

| | | |
|---|---|---|
| 1,521,078 | Corigliano | Dec. 30, 1924 |
| 1,812,238 | Hammer | June 30, 1931 |
| 2,042,579 | Bergstrom | June 2, 936 |
| 2,517,651 | Frost | Aug. 8, 1950 |

FOREIGN PATENTS

| | | |
|---|---|---|
| 329,800 | Italy | Sept. 23, 1935 |

OTHER REFERENCES

"Iodine and Plant Life," pub. 1944 by Chilean Iodine Educational Bureau, London, England; pp. 80–83.

Biological Abstracts, vol. 25, p. 1970, Entry 21,675, pub. 1951.